United States Patent [19]
Howland

[11] Patent Number: 5,168,713
[45] Date of Patent: Dec. 8, 1992

[54] METHOD OF OPERATING A COMPARTMENTALIZED TRANSPORT REFRIGERATION SYSTEM

[75] Inventor: Leland L. Howland, Belle Plaine, Minn.

[73] Assignee: Thermo King Corporation, Minneapolis, Minn.

[21] Appl. No.: 851,389

[22] Filed: Mar. 12, 1992

[51] Int. Cl.$^5$ .................................. F25B 5/00
[52] U.S. Cl. ........................... 62/117; 62/160; 62/200; 62/228.4; 62/229
[58] Field of Search ............ 62/160, 199, 200, 196.4, 62/157, 229, 203, 228.4, 324.6, 239, 117

[56] References Cited

U.S. PATENT DOCUMENTS

| | | | |
|---|---|---|---|
| 4,122,686 | 10/1978 | Lindahl et al. | 62/81 |
| 4,221,421 | 9/1980 | Bettker et al. | 296/248 |
| 4,419,866 | 12/1983 | Howland | 62/228.4 |
| 4,685,306 | 8/1987 | Howland et al. | 62/117 |
| 4,706,468 | 11/1987 | Howland et al. | 62/199 |
| 4,711,095 | 12/1987 | Howland et al. | 62/117 |
| 4,712,383 | 12/1987 | Howland et al. | 62/200 |
| 4,878,357 | 11/1989 | Sekigami et al. | 62/160 |
| 4,896,512 | 1/1990 | Howland | 62/117 |
| 4,912,940 | 4/1990 | Anderson et al. | 62/239 |
| 4,932,219 | 6/1990 | Howland et al. | 62/174 |
| 5,012,653 | 5/1991 | Ryde et al. | 62/203 |
| 5,065,587 | 11/1991 | Howland et al. | 62/200 X |

FOREIGN PATENT DOCUMENTS 988874 4/1964 United Kingdom .

Primary Examiner—Harry B. Tanner
Attorney, Agent, or Firm—D. R. Lackey

[57] ABSTRACT

A method of operating a compartmentalized transport refrigeration system having first, second and third compartments respectively served by a host refrigeration unit and first and second remote refrigeration units. The method includes the steps of providing a first signal when either of the first and second remote refrigeration units is in a cooling cycle, cycling the host refrigeration unit between cooling and heating cycles to hold a selected set point temperature of a fresh load in the first compartment, in the absence of the first signal, and providing a predetermined null period between the heating and cooling cycles of the host unit when the first signal is present. In a preferred embodiment a prime mover for a refrigerant compressor is operable at a selected one of high and low speeds, with the method including the step of preventing high speed operation when any remote refrigeration unit is in a heating cycle.

8 Claims, 4 Drawing Sheets

METHOD OF OPERATING A COMPARTMENTALIZED TRANSPORT REFRIGERATION SYSTEM

TECHNICAL FIELD

The invention relates in general to transport refrigeration systems, such as transport refrigeration systems for trucks and trailers, and more specifically to methods of operating a transport refrigeration system having three compartments containing loads to be conditioned by the transport refrigeration system.

BACKGROUND ART

Compartmentalized transport refrigeration systems of the prior art conventionally utilize a host refrigeration unit mounted on the nose of a truck or trailer, which serves a front compartment directly behind the nose wall, and one or more remote compartments containing remote refrigeration units. The remote compartments are usually arranged in series between the front compartment and the back wall of the truck or trailer. The remote refrigeration units disposed in the remote compartments each include an evaporator which is connected to hot gas, liquid and suction lines of the host refrigeration unit, via hot gas, liquid and suction lines associated with each remote unit.

In such prior art compartmentalized transport refrigeration systems, the front compartment served by the host refrigeration unit always serves the lowest temperature load, eg., if there is a frozen load, the front compartment must serve the frozen load. This limits the flexibility of the user in selecting the sequence in loading frozen and fresh loads, and if the compartments are of different sizes, the loads must be placed in the compartments according to the temperatures which the compartments can control, rather than matching the size of a load to the size of a compartment. Thus, it would be desirable, and it is an object of the invention, to be able to accommodate any temperature load in any compartment, and especially to provide such flexibility in transport refrigeration systems having first, second and third compartments to be respectively conditioned by a host refrigeration system and by first and second remote refrigeration units.

SUMMARY OF THE INVENTION

Briefly, the present invention is a method of operating a compartmentalized transport refrigeration system having first, second and third compartments respectively served by a host refrigeration unit, and first and second remote refrigeration units. The host refrigeration unit includes a compressor, a prime mover for the compressor operable at a selected one of predetermined low and high speeds, a condenser, an evaporator, and hot gas, liquid and suction lines. Each of the first and second remote refrigeration units, which are connected to the host refrigeration unit, include an evaporator, and hot gas, liquid and suction lines. Electrical control associated with each of the host and first and second remote refrigeration units respectively maintains selected set point temperatures in the first, second and third compartments of the transport refrigeration system via hot gas heating and cooling cycles.

The method includes the steps of providing a first signal COOL1 when either of the first and second remote refrigeration units is in a cooling cycle, cycling the host refrigeration unit between cooling and heating cycles to hold a selected set point temperature of a fresh load in the first compartment, in the absence of said first signal, and providing a null period between the heating and cooling cycles of the host unit when said first signal is present. The method preferably includes the step of terminating such a null period when the temperature of the first compartment drops to a predetermined value below the selected set point temperature, and when the first signal is no longer being provided, which ever occurs first.

The step of providing a null period between the cooling and heating cycles of the host refrigeration unit includes the step of preventing the host refrigeration unit from operating in a heating cycle in a predetermined temperature zone directly adjacent to the set point associated with the host refrigeration unit, while either, or both, of the first and second remote refrigeration units is in a cooling cycle.

In another embodiment of the invention, the method includes the steps of providing a second signal HEAT which indicates when either, or both, of the first and second remote refrigeration units is in a heating cycle, and preventing the operation of the prime mover at the predetermined high speed while the second signal is being provided.

In still another embodiment of the invention, the method includes the steps of providing a control voltage from the electrical control associated with each refrigeration unit in a cooling cycle, applying each such control voltage to the electrical control of each of the other refrigeration units, and using the control voltage to modify the electrical control of a refrigeration unit in a heating cycle, to cause the evaporator of each refrigeration unit in a heating cycle to function as a condenser for each refrigeration unit in a cooling cycle. The step of using a control voltage being provided by a refrigeration unit in a cooling cycle to modify the control of each refrigeration unit in a heating cycle, in a preferred embodiment, includes the steps of closing the suction line valve of each refrigeration unit in a heating cycle, and opening each closed suction line valve as soon as a refrigeration unit associated with a closed suction line valve terminates a heating cycle.

In another embodiment of the invention, the method includes the steps of providing controllable valves in the hot gas, liquid and suction lines of each of the host and first and second remote refrigeration units, providing a unidirectional suction line to liquid line refrigerant flow path in each of the host and first and second remote refrigeration units, and providing a suction line check valve in the suction line of each of the host and first and second remote refrigeration units, whereby each of the host and first and second remote refrigeration units may selectively condition a fresh load or a frozen load in the associated compartment.

In still another embodiment of the invention, the method includes the step of providing substantially the same evaporator cooling capacities for the evaporators associated with the host and first and second remote refrigeration units.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
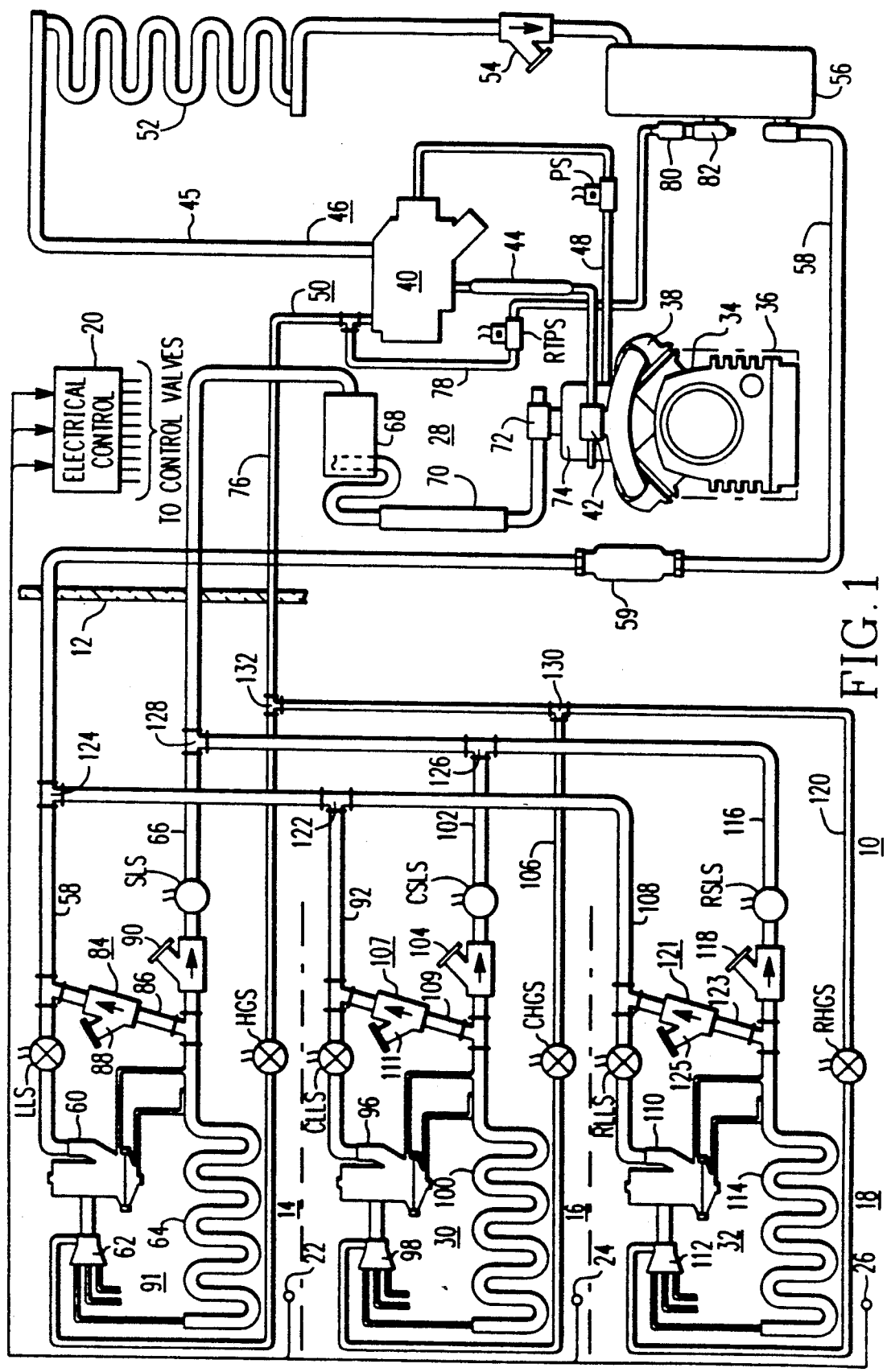
FIG. 1 illustrates a refrigerant piping diagram of a compartmentalized, multi-temperature transport refrigeration system having a host and first and second remote refrigeration units which may be operated according to the methods of the invention.

Referring now to the drawings, and to FIG. 1 in particular, there is shown a schematic piping diagram of a compartmentalized, multi-temperature transport refrigeration system 10 which may be operated according to the methods of the invention. System 10 is associated with a truck or trailer 12 having first, second and third compartments 14, 16 and 18, respectively, to be conditioned, with compartment 14 being a front compartment, compartment 16 an intermediate compartment, and compartment 18 being a rear or back compartment, for example. System 10 is controlled by electrical temperature control 20, shown in block form in FIG. 1 and in detail in FIGS. 2A and 2B, with temperature control 20 having temperature sensors 22, 24 and 26 disposed in compartments 14, 16 and 18, respectively.

Transport refrigeration system 10 includes a host refrigeration unit 28, which is controlled in response to temperature sensor 22, and first and second remote refrigeration units 30 and 32 which are controlled by temperature sensors 24 and 26, respectively. The remote evaporator units 30 and 32 may be constructed according to U.S. Pat. No. 4,912,940, for example, which patent is assigned to the same assignee as the present application. FIG. 1 also illustrates refrigerant piping between the three units, a plurality of controllable solenoid valves having open and closed positions, and check valves. While the controlled valves will be hereinafter referred to as having a specified normal deenergized position, it will be understood that the opposite de-energized condition may be used by merely modifying the associated electrical temperature control 20 accordingly.

The host refrigeration unit 28 includes closed fluid circuits which include a refrigerant compressor 34 driven by a prime mover which includes an internal combustion engine, with the prime mover being indicated generally by broken outline 36. Compressor 34 includes discharge ports 38 connected to refrigeration circuit selecting valve means 40 via a discharge service valve 42 and a hot gas line 44. Valve means 40 may be a three-way valve, as illustrated, or, as will be hereinafter explained, a single condenser inlet valve may be used, if desired. For purposes of example, valve means 40 will be referred to as three-way valve 40.

Three-way valve 40 is controlled by a pilot solenoid valve PS. When pilot solenoid valve is deenergized, three-way valve 40 is biased to a position which directs hot refrigerant vapor, hereinafter called a gas, from compressor 34 into a first refrigerant circuit 46 initiated by a hot gas line 45. When pilot solenoid PS is energized, low-side compressor pressure via conduit 48 operates three-way valve 40 to a position which directs hot gas from compressor 34 into a second refrigerant circuit 50. The first refrigerant circuit 46 directs hot refrigerant gas into a closed loop which includes hot gas line 45, a condenser 52, a check valve 54, a receiver 56, a liquid line 58, a refrigerant drier 59, a normally closed liquid line solenoid valve LLS, an expansion valve 60, a refrigerant distributor 62, an evaporator 64, a suction line 66 which extends to an accumulator 68, with suction line 66 including a normally open suction line solenoid valve SLS, and a suction line 70 which extends from accumulator 68 to a suction port of compressor 34 via a suction line service valve 72 and a throttling valve 74.

The first refrigerant circuit 46 is the normal cooling circuit for host refrigeration unit 28, removing heat from the first truck or trailer compartment 14, which is associated with host evaporator 64 and temperature sensor 22, and rejecting heat in condenser 52 to ambient air.

When host evaporator 64 requires heat for defrosting, or for holding a selected set point temperature within compartment 14, as sensed by temperature sensor 22, electrical control 20 energizes and opens pilot solenoid valve PS. Pilot solenoid PS then directs hot gas into the second refrigerant circuit 50. The second refrigerant circuit 50 includes a hot gas line 76, a normally closed hot gas solenoid valve HGS, and the hereinbefore mentioned refrigerant distributor 62, evaporator 64, suction line 66, suction line solenoid valve SLS, accumulator 68 and suction line 70. A receiver pressurizing line 78 extends from hot gas line 76 to receiver 56 via a check valve 80 and service valve 82. As disclosed in U.S. Pat. No. 4,932,219, which is assigned to the same assignee as the present application, pressurizing line 78 may include a controllable solenoid valve RTPS, which is controlled by electrical control 20 to apply receiver pressurization only when required, such as by sensing compressor head pressure.

In order to enable an evaporator operating in a heating cycle to function as a condenser for another evaporator operating in a cooling cycle, a unidirectional suction line to liquid line by-pass 84 is provided between suction line 66 and liquid line 58, with by-pass 84 including a conduit 86 having a check valve 88. In order to enable any evaporator to function at any temperature, to selectively service frozen or fresh loads in the associated compartment, a suction line check valve 90 is provided in suction line 66, between evaporator 64 and suction line solenoid valve SLS.

The first and second remote refrigeration units 30 and 32 are schematically similar to the evaporator section 91 of the host unit 28. The first remote refrigeration unit 30 includes a liquid line 92 having a normally closed liquid line solenoid valve CLLS, an expansion valve 96, a refrigerant distributor 98, an evaporator 100, a suction line 102 having a check valve 104 and a normally open suction line solenoid valve CSLS, and a hot gas line 106 having a normally closed hot gas solenoid CHGS. A suction line 66 to liquid line 92 bypass 107 includes a conduit 109 having a check valve 111.

In like manner, the second remote refrigeration unit 32 includes a liquid line 108 having a normally closed liquid line solenoid valve RLLS, an expansion valve 110, a refrigerant distributor 112, an evaporator 114, a suction line 116 having a check valve 118 and a normally open suction line solenoid valve RSLS, and a hot gas line 120 having a normally closed hot gas solenoid RHGS. A suction line 116 to liquid line 108 by-pass 121 includes a conduit 123 and a check valve 125.

Remote liquid lines 92 and 108 are connected to host liquid line 58 via tees 122 and 124, remote suction lines 102 and 116 are connected to host suction line 66 via tees 126 and 128, and remote hot gas lines 106 and 120 are connected to host hot gas line 76 via tees 130 and 132.

Figure 2A:
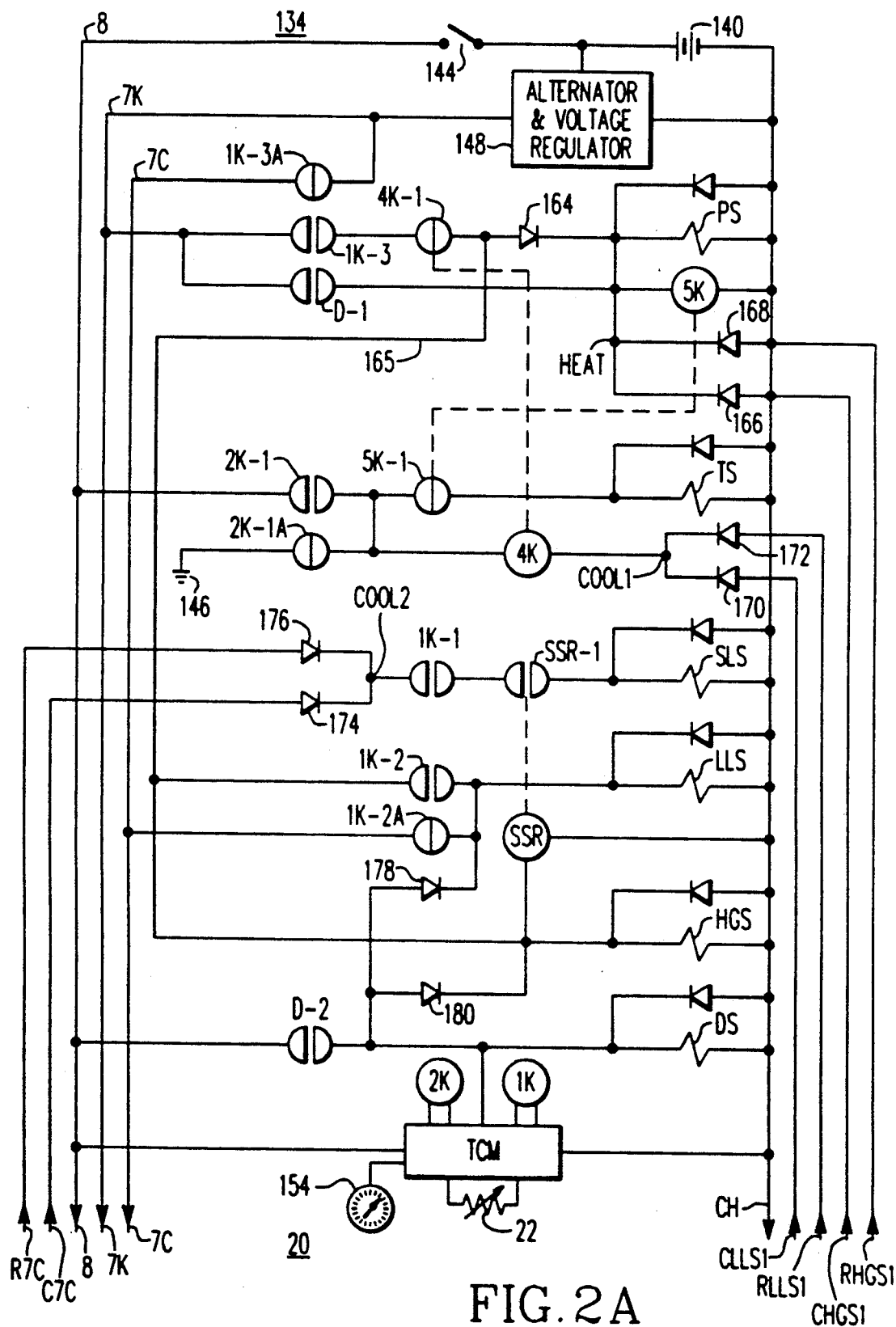
FIGS. 2A and 2B may be assembled to provide a schematic diagram of electrical control for operating the host and first and second remote refrigeration units shown in FIG. 1 according to the teachings of the invention.
Figure 2B:
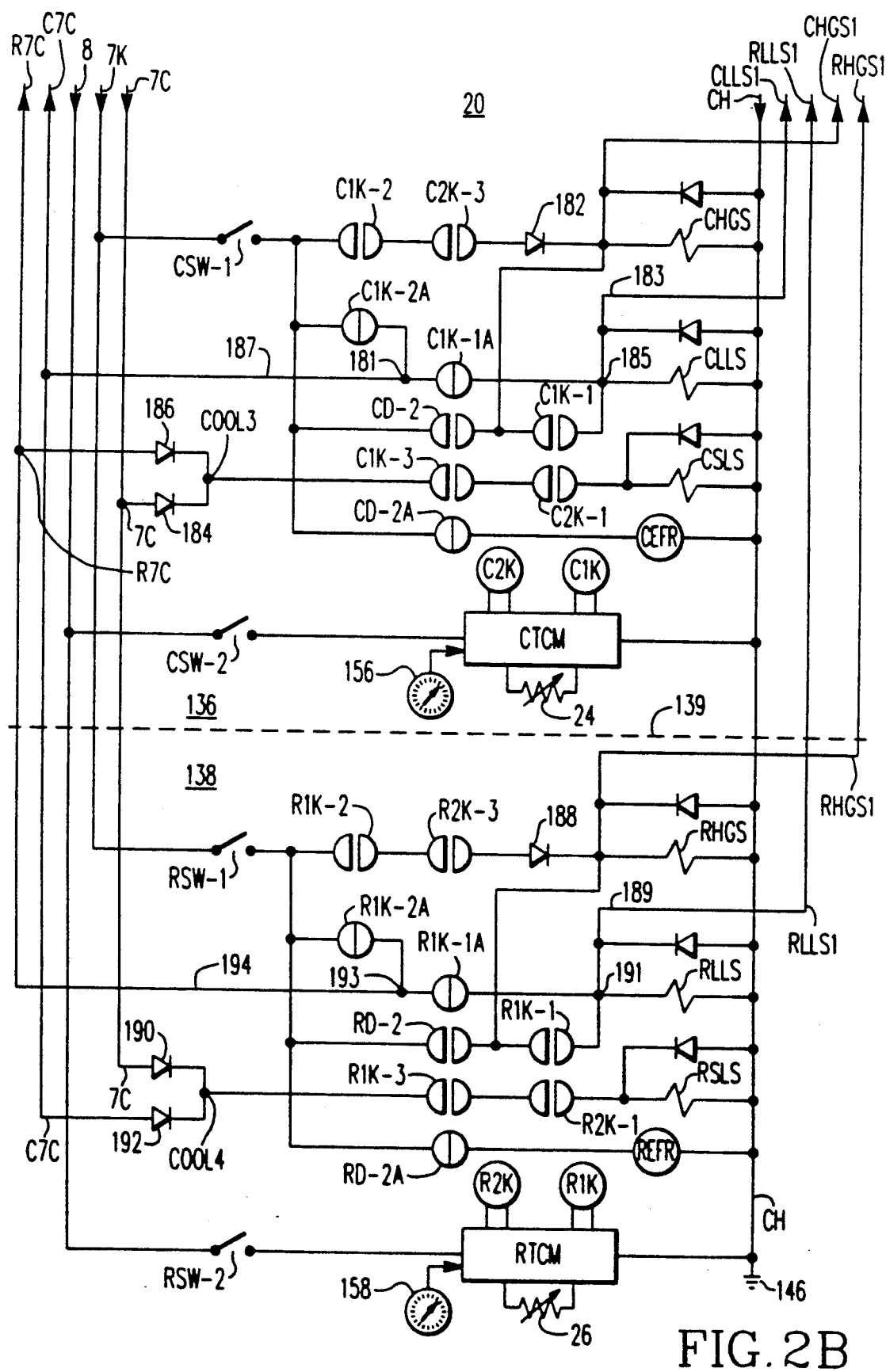

FIGS. 2A and 2B may be assembled to provide an electrical schematic diagram of electrical control 20 shown in block form in FIG. 1, which operates transport refrigeration system 10 shown in FIG. 1 according to the teachings of the invention. FIG. 2A sets forth an electrical control section 134 of electrical control 20 which is associated with the control of host unit 28, while FIG. 2B sets forth electrical control sections 136 and 138 of control 20 which are respectively associated with the first and second remote refrigeration units 30 and 32. Broken line 139 divides control sections 136 and 138.

A battery 140 is connected between a first conductor 8 via an on-off switch 144, and a second conductor CH, with conductor CH being connected to chassis ground 146. Thus, conductor 8 provides a control voltage directly from battery 134. An alternator and voltage regulator, shown generally at 148, which assembly is connected across battery 140, provides a regulated output voltage on conductor 7K while prime mover 36 is driving the alternator.

Host unit control section 134 includes a thermostatic control module TCM connected between conductors 8 and CH. Control module TCM includes the hereinbefore mentioned temperature sensor 22 disposed in conditioned space or compartment 14 served by host unit 28, a heat relay 1K, and a speed relay 2K.

Figure 3:
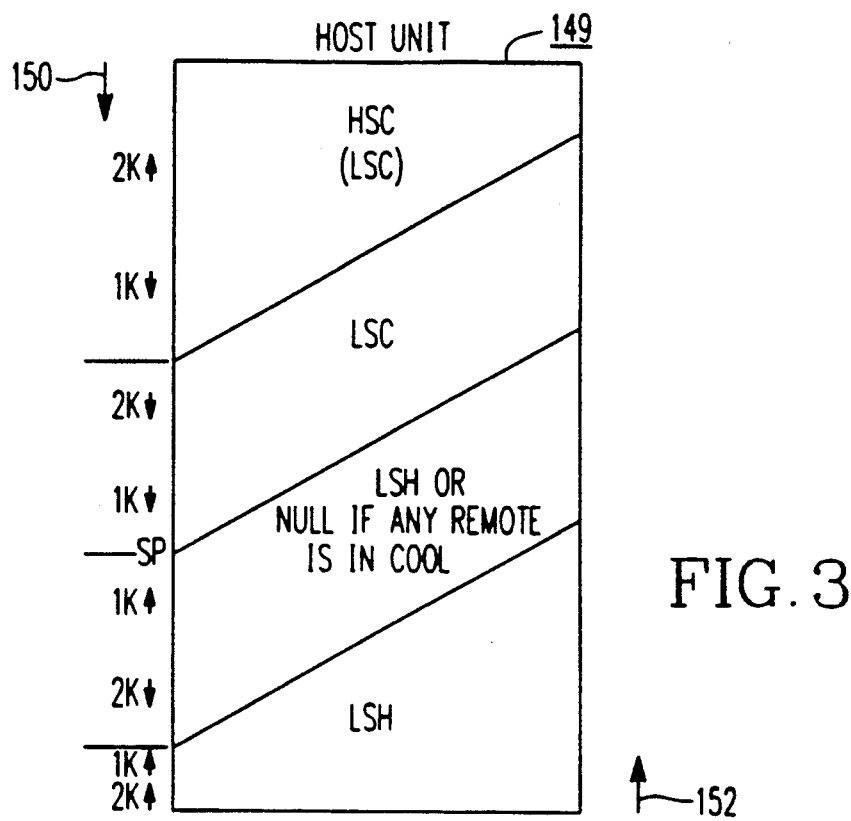
FIG. 3 diagrammatically sets forth a control algorithm illustrating the operation of the host refrigeration unit shown in FIG. 1.

FIG. 3 is a chart 149 of a control algorithm for host unit 28, illustrating the various operating modes selectable by heat and speed relays 1K and 2K. A falling temperature in compartment 14 is indicated by arrow 150 along the left-hand side of chart 149, and a rising temperature is indicated by arrow 152 along the right-hand side of chart 149. Upwardly and downwardly pointing arrows associated with relays 1K and 2K respectively indicate energization and de-energization thereof. For example, when the speed relay 2K is "in" (energized) and the heat relay 1K is "out" (de-energized), host unit 28 will be normally be in a high speed cooling mode (HSC). When any remote unit is in a heating cycle, as will be hereinafter described, the high speed mode will be prevented, and thus instead of being in high speed cool, host unit 28 will be in low speed cool in this portion of the chart. Preventing a high speed mode when any remote unit is in a heating cycle has been found to significantly reduce the cost of a three compartment system. It was found that if the host unit 28 is allowed to go into high speed cool while a remote is in a heating cycle, that the remote evaporators would have to have a larger capacity, which thus requires that system 10 have more refrigerant. Adding refrigerant, however, increases the chances of slugging, which could damage the compressor. The amount of refrigerant should not exceed the capacity of the accumulator, and there is a practical limit on the size of the accumulator.

When the temperature of the controlled space or compartment 14, or a control error calculated from the temperature of compartment 14, approaches a selected set point temperature SP, both the heat and speed relays 1K and 2K will be out, and host unit 28 will switch to a low speed cool mode (LSC), if it was in high speed cool. The set point temperature SP is manually selected on a set point selector 154 associated with temperature control module TCM.

When the compartment temperature has been pulled down to the set point temperature SP, the heat relay 1K picks up and the speed relay 2K will still be out, which combination will normally cause the host unit to operate in a low speed heat mode (LSH). With a continuously operated compressor, the refrigerant must be continually circulated somewhere, and when both remote units are satisfied, the host unit 28 will cycle back and forth between heating and cooling cycles, with a predetermined hysteresis, to hold the selected set point. This cycling mode was tried with one or both remote units active. It was found that because of refrigerant response time, ie., the refrigerant doesn't move around the system as quickly as electrical control functions can rearrange the refrigeration circuits, instability and ineffective operation, including starvation of the remote evaporators, can occur when host unit 28 is allowed to switch directly between cooling and heating cycles while any one, or both, remote units are in a cooling cycle. This problem was solved by forcing host unit 28 to go through a null period between cooling and heating cycles, when any remote unit is in a cooling cycle. If both remote units are satisfied and in null, or one or both remote units are in heating cycles with a unit not in a heating cycle being in null, then the host unit 28 is allowed to operate directly between heating and cooling cycles, without a forced null period.

If the temperature of compartment 14 should continue to fall, a control point is reached in which both the heat and speed relays 1K and 2K will be energized, and host unit 28 will operate in low speed heat (LSH). If host unit 28 had been forced into a null period by one or both remote units being in a cooling cycle, then the null period would end when the speed relay 2K picks up. Of course, the forced null period would also end when no remote is in a cooling cycle, and also in the event the temperature of compartment 14 rises to a control point which initiates low speed cool (LSC).

Should host unit 28 be serving a frozen load, heat would be normally locked out, but the host unit would still operate between heating and cooling cycles, notwithstanding a heat lock out, to hold set point when no remote unit is active, as the refrigerant must circulate in a continuously operating system. In a start-stop system, such as disclosed in U.S. Pat. No. 4,419,866, which is assigned to the same assignee as the present application, when all three units are satisfied, system 10 would be automatically shut down, until re-started by one of the refrigeration units coming out of "null".

As shown in FIG. 2B, the first remote unit 30 includes a thermostat control module CTCM connected between conductors 8 and CH via an on-off switch CSW-2. Switch CSW-2, which is ganged with a switch CSW-1, is closed when remote unit 30 is activated. Temperature control module CTCM includes the hereinbefore mentioned temperature sensor 24 disposed in compartment 16, a heat relay C1K, a speed relay C2K, and a set point selector 156.

In like manner, the second remote unit 32 includes a thermostat control module RTCM connected between conductors 8 and CH via an on-off switch RSW-2.

Switch RSW-2, which is ganged with a switch RSW-1, is closed when remote unit 32 is activated. Temperature control module RTCM includes the hereinbefore mentioned temperature sensor 26 disposed in compartment 18, a heat relay R1K, a speed relay R2K, and a set point selector 158.

Figure 4:
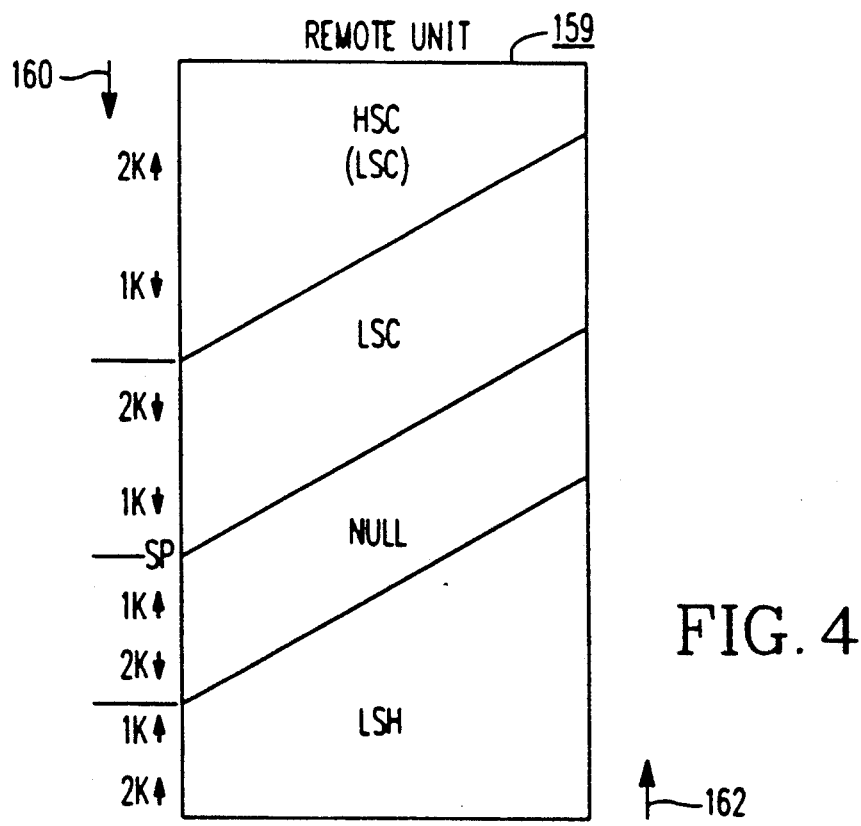
FIG. 4 diagrammatically sets forth a control algorithm illustrating the operation of each of the first and second remote refrigeration units shown in FIG. 1.

FIG. 4 is a chart 159 of a control algorithm for each of the two remote units 30 and 32, illustrating the various operating modes selectable by their heat and speed relays, which are identified 1K and 2K in FIG. 4. A falling temperature in compartments 16 and 18 is indicated by an arrow 160 along the left-hand side of chart 159, and a rising temperature is indicated by an arrow 162 along the right-hand side of chart 159. When speed relay C2K (or R2K) is energized, and heat relay C1K (or R1K) is de-energized, the remote unit will be in high speed cool (HSC) if host unit 28 is in high speed cool, and otherwise the remote unit will be in low speed cool (LSC). Thus, during initial temperature pull-down, all units will be in high speed cool. As the temperature, or control error, of the associated compartment approaches set point, speed relay C2K (or R2K) drops at a predetermined control point, and the operating mode will be low speed cool (LSC). When set point is reached, the unit will be satisfied, ie., requiring neither heat nor cool to hold set point, heat relay C1K (or R1K) picks up and the remote unit goes into a null period. If the temperature of the associated compartment continues to drop, the speed relay C2K (or R2K) picks up at a predetermined control point and the operating mode changes to low speed heat (LSH). The null period may be selected to be a relatively narrow band when a fresh load is being conditioned.

Returning to FIG. 2A, pilot solenoid PS is connected between conductors 7K and CH via a first circuit which includes a normally open contact 1K-3 of host heat relay 1K, a normally closed contact 4K-1 of a heat-blocking relay 4K, and a diode 164. As will be hereinafter explained, host unit 28 will go into a heating mode when its heat relay 1K picks up and closes contact 1K-3, except when a remote unit is in a cooling cycle, which results in heat-blocking relay 4K being energized, which opens contact 4K-1 and prevents host unit 28 from energizing pilot solenoid PS, as well as other circuit components which are energized by a conductor 165 connected between contact 4K-1 and diode 164. Heat-blocking relay 4K is energized when host speed relay 2K is deenergized, via a normally closed contact 2K-1A, and via a signal or control voltage COOL1. Signal COOL1 is provided via a signal CLLS1 and a diode 170 when remote unit 30 is in a cooling cycle, and also via a signal RLLS1 and a diode 172 when remote unit 32 is in a cooling cycle.

Pilot solenoid PS is also energized via a normally open contact D-1 of a host defrost relay D (not shown), with defrost relay D being energized when evaporator 64 of host unit 28 requires defrosting. Pilot solenoid PS is also energized by a signal or control voltage HEAT, which is provided when either ,or both, of the remote units 30 and 32 require a heating cycle to hold set point, or to defrost their associated evaporators 100 and 114. As will be hereinafter explained, signal HEAT is provided by a signal CHGS1 and a diode 166, when remote unit 30 requires a heating cycle, and also by a signal RHGS1 and a diode 168, when remote unit 32 requires a heating cycle.

A throttle solenoid TS is connected to a throttle on engine 36 via a suitable linkage, such that when solenoid TS is energized engine 36 operates at a predetermined elevated speed, such as 2200 RPM, and when solenoid TS is de-energized engine 36 operates at a predetermined lower speed, such as 1400 RPM. Throttle solenoid TS is connected between conductors 8 and CH via a circuit which includes a normally open contact 2K-1 of the host speed relay 2K, and via a normally closed contact 5K-1 of a high speed blocking relay 5K. As illustrated, high speed blocking relay 5K is connected across pilot solenoid PS, and is energized when any of the three compartments 14, 16, and 18 is in a heating cycle. Thus, host unit 28 will switch engine 36 to high speed when speed relay 2K is energized, except when any unit is in a heating cycle. As hereinbefore set forth, blocking high speed when a unit is in a heating cycle makes a three compartment transport refrigeration system practical. Allowing high speed operation with a remote unit in a heating cycle would require that the evaporators of the remote units have a larger capacity, which in turn would increase the amount of refrigerant required in system 10. Increasing the amount of refrigerant, without increasing the size of the accumulator 68 would endanger the compressor 34. Increasing the size of the accumulator is not a desirable option, as it would increase the size, weight and cost of host unit 28. Host unit 28 is sized to fit within a predetermined space on the nose of a trailer or truck, for example, and cannot intrude into space required for turning the tractor or lifting a cab.

Host suction line solenoid SLS, which is normally open, is closed when host unit 28 is in a heating cycle, and one, or both, of the remote units 30 and 32 is in a cooling cycle, making host evaporator 64 function as a condenser for each remote unit in a cooling cycle. Host suction line solenoid SLS is connected to receive a signal or control voltage COOL2, and to conductor CH, via a normally open contact 1K-1 of host heat relay 1K, and via a normally open contact SSR-1 of a suction solenoid relay SSR. If host unit 28 is calling for a heating cycle, host heat relay 1K will be energized, closing contact 1K-1, and if host heating is not blocked by heat blocking relay 4K, suction solenoid relay SSR will be energized, as it is connected across host hot gas solenoid HGS. Solenoid HGS is only energized when host unit 28 is actually in a heating cycle. Signal COOL2 is provided by a signal or control voltage C7C and a diode 174 when remote unit 30 is in a cooling cycle, and also by a signal or control voltage R7C and a diode 176 when remote unit 32 is in a cooling cycle.

Host liquid line solenoid LLS, which is normally closed, is connected between conductors 7K and CH via a circuit which includes two normally closed contacts 1K-3A and 1K-2A of host heat relay 1K. Thus, when host unit 28 requires a cooling cycle, heat relay 1K will be deenergized, opening liquid line solenoid LLS to initiate a cooling cycle. Liquid line solenoid LLS is also opened during host heating, if neither remote is in cool, to get more refrigerant into the system, via a first circuit which includes normally open contact 1K-3 of heat relay 1K, normally closed contact 4K-1 of heat-blocking relay 4K, and a normally open contact 1K-2 of heat relay 1K; and, alternatively via a second circuit which includes a normally open contact D-2 of defrost relay D, and a diode 178.

Host hot gas solenoid HGS, which is normally closed, is connected between conductors 7K and CH, and is energized to initiate host heating via a first circuit which includes the normally open contact 1K-3 of host heat relay 1K and normally closed contact 4K-1 of heat-blocking relay 4K, and alternatively via a second circuit which includes the normally open contact D-2 of host defrost relay D and a diode 180. Contact D-2 of the host defrost relay D also energizes a damper solenoid DS, which closes dampers which prevent host evaporator fans or blowers from discharging warm air into compartment 14 during defrost of host evaporator 64.

Control section 136 associated with remote unit 30 is set forth in FIG. 2B. Control section 136 is energized by conductor 7K when on-off switch CSW-1 is closed. Remote hot gas solenoid CHGS is connected between switch CSW-1 and conductor CH via normally open contacts C1K-2 and C2K-3 of remote heat and speed relays C1K and C2K, respectively, and a diode 182. As shown in FIG. 4, low speed heat (LSH) in a remote unit is initiated when both relays C1K and C2K are energized. When remote hot gas solenoid CHGS is energized, control signal or voltage CHGS1 is also provided which energizes pilot solenoid PS via signal HEAT. Remote hot gas solenoid CHGS is also energized by a normally open contact CD-2 of a remote defrost relay CD (not shown), when evaporator 100 of remote 30 requires defrosting. A normally closed contact CD-2A opens when remote defrost relay CD is energized, dropping an evaporator fan relay CEFR to de-energize evaporator fans or blowers, preventing warm air from being discharged into compartment 16.

Remote liquid line solenoid CLLS, which is normally closed, is connected between switch CSW-1 and conductor CH, and is energized by a first circuit when a remote cooling cycle is required, with the first circuit including normally closed contacts C1K-2A and C1K-1A of remote heat relay C1K. Remote liquid line solenoid CLLS is energized via a second circuit when a remote heating cycle is required, to allow more refrigerant to enter the heating cycle, with the second circuit including the hereinbefore mentioned normally open contacts C1K-2 and C2K-3 and diode 182, and a normally open contact C1K-1 of remote heat relay C1K. Normally open contact CD-2 of remote defrost relay CD will also energize CLLS if heat relay C1K is energized, via normally open contact C1K-1.

When remote liquid line solenoid CLLS is energized due to a cooling cycle, a true or high signal CLSS1 is provided via a conductor 183 which is connected to a junction 185 between contact C1K-1A and solenoid valve CLLS. Signal CLSS1, when true, results in signal or voltage COOL1 going high to energize heat-blocking relay 4K. A junction 181 between contacts C1K-2A and C1K-1A also provides a true or high signal C7C via a conductor 187 when solenoid valve CLLS is energized due to a cooling cycle, which provides a true signal COOL2, and a true signal COOL4 associated with remote unit 32.

Remote suction line solenoid CSLS is connected to receive a signal or control voltage COOL3, and to conductor CH, via normally open contacts C1K-3 and C2K-1 of remote heat and speed relays C1K and C2K. Signal COOL3 is present when either signal 7C from host unit 28 is high, or signal R7C from remote unit 32 is high, via diodes 184 and 186, respectively, with signals 7C and R7C being high when their associated units are in a cooling cycle. Contacts C1K-3 and C2K-1 are closed when remote unit 30 is in a heating cycle. Thus, when remote unit 30 is in a heating cycle, and one, or both of the other two units are in a cooling cycle, suction line solenoid CSLS is closed to direct refrigerant through by-pass 107 to the evaporator(s) of the units in a cooling cycle, causing evaporator 100 to function as a condenser for the units in a cooling cycle. As soon as the heating cycle in the remote unit terminates, contact C1K-3 opens to de-energize suction line solenoid CSLS and open suction line 102. It was found that if the suction line of a satisfied remote unit remains closed during the null period, that refrigerant soon collects in the evaporator of the satisfied remote unit. Thus it is important to open the suction line of a remote unit in a null period.

In like manner, control section 138 associated with remote unit 32 is set forth in FIG. 2B. Control section 138 is energized by conductor 7K when on-off switch RSW-1 is closed. Remote hot gas solenoid RHGS is connected between switch RSW-1 and conductor CH via normally open contacts R1K-2 and R2K-3 of remote heat and speed relays R1K and R2K, respectively, and a diode 188. As shown in FIG. 4, low speed heat (LSH) in a remote unit is initiated when both relays R1K and R2K are energized. When remote hot gas solenoid RHGS is energized, control signal or voltage RHGS1 is also provided which energizes pilot solenoid PS via signal HEAT. Remote hot gas solenoid RHGS is also energized by a normally open contact RD-2 of a remote defrost relay RD (not shown), when evaporator 114 of remote 32 requires defrosting. A normally closed contact RD-2A opens when remote defrost relay RD is energized, dropping an evaporator fan relay REFR to de-energize evaporator fans or blowers, preventing warm air from being discharged into compartment 18.

Remote liquid line solenoid RLLS, which is normally closed, is connected between switch RSW-1 and conductor CH, and is energized by a first circuit when a remote cooling cycle is required, with the first circuit including normally closed contacts R1K-2A and R1K-1A of remote heat relay C1K. Remote liquid line solenoid RLLS is energized via a second circuit when a remote heating cycle is required, with the second circuit including the hereinbefore mentioned normally open contacts R1K-2 and R2K-3 and diode 188, and a normally open contact R1K-1 of remote heat relay R1K. Normally open contact RD-2 of remote defrost relay CD will also energize RLLS if heat relay R1K is energized, via normally open contact R1K-1.

When remote liquid line solenoid RLLS is energized due to a cooling cycle, a true or high signal RLSS1 is provided via a conductor 189 which is connected to a junction 191 between contact R1K-1A and solenoid valve RLLS. Signal RLSS1, when true, results in signal or voltage COOL1 going high to energize heat-blocking relay 4K. A junction 193 between contacts R1K-2A and R1K-1A also provides a true or high signal R7C via a conductor 194 when solenoid valve RLLS is energized due to a cooling cycle, which results in signals COOL2 and COOL3 going high.

Remote suction line solenoid RSLS is connected to receive a signal or control voltage COOL4, and to conductor CH, via normally open contacts R1K-3 and R2K-1 of remote heat and speed relays R1K and R2K. Signal COOL4 is present when either signal 7C from host unit 28 is high, or signal C7C from remote unit 30 is high, via diodes 190 and 192, respectively, with signals 7C and C7C being high when their associated units are in a cooling cycle. Contacts R1K-3 and R2K-1 are closed when remote unit 32 is in a heating cycle. Thus, when remote unit 32 is in a heating cycle, and one, or both of the other two units are in a cooling cycle, suction line solenoid RSLS is closed to direct refrigerant through by-pass 121 to the evaporator(s) of the units in a cooling cycle, causing evaporator 114 to function as a condenser for the units operating in a cooling cycle. As soon as the heating cycle in the remote unit terminates, contact R1K-3 opens to de-energize suction line solenoid RSLS and open suction line 116.

It was found that for a successful operation of a three unit compartmentalized transport refrigeration system that it is important that all three evaporators 64, 100 and 114 be of substantially the same capacity. Otherwise the refrigerant ends up in the largest evaporator under certain operating conditions, such as when the largest evaporator has been acting as a condenser for a smaller evaporator, or evaporators. The smaller evaporators do not receive sufficient refrigerant to cool properly, which reduces the amount of heat for the heating evaporator to reject, thus reducing the efficiency of both of the on-going cooling and heating cycles.

While the invention has been described with a three-way valve 40, the fact that all three units 28, 30 and 32 utilize hot gas solenoids to control heating in each of the associated evaporators, enables the relatively slow and costly three-way valve 40 to be replaced with a single, fast acting, less costly condenser inlet valve. In such an embodiment, hot gas line 44 would be connected to hot gas line 45 via the condenser inlet valve, and hot gas line 76 would be connected between the condenser inlet valve and compressor 34. Since selective pressurization of receiver 56 is utilized via solenoid valve RTPS, line 78 may be connected from receiver 56 to hot gas line 44 or hot gas line 76.

I claim:

1. A method of operating a compartmentalized transport refrigeration system having a host refrigeration unit which includes a compressor, a prime mover for the compressor operable at a selected one of predetermined low and high speeds, a condenser, an evaporator, and hot gas, liquid and suction lines; first and second remote refrigeration units connected to the host refrigeration unit, with each of the first and second remote refrigeration units having an evaporator, hot gas, liquid and suction lines; and electrical control associated with each of the host and first and second remote refrigeration units for respectively holding selected set point temperatures in first, second and third associated compartments of the transport refrigeration system via heating and cooling cycles, comprising the steps of:
   providing a first signal when either of the first and second remote refrigeration units is in a cooling cycle,
   cycling the host refrigeration unit between cooling and heating cycles to hold a selected set point temperature of a fresh load in the first compartment, in the absence of said first signal,
   and providing a null period between the heating and cooling cycles of the host unit when said first signal is present.

2. The method of claim 1 including the step of terminating a null period when the temperature of the first compartment drops to a predetermined value below set point, and when the first signal is no longer being provided, which ever occurs first.

3. The method of claim 1 including the step of providing substantially the same evaporator cooling capacities for the evaporators associated with the host and first and second remote refrigeration units.

4. The method of claim 1 including the steps of:
   providing a second signal which indicates when either of the first and second remote refrigeration units is in a heating cycle,
   and preventing the operation of the prime mover at the predetermined high speed while said second signal is being provided.

5. The method of claim 1 wherein the step of providing a null period between the cooling and heating cycles of the host refrigeration unit includes the step of preventing the host refrigeration unit from operating in a heating cycle in a predetermined temperature zone directly adjacent to the set point associated with the host refrigeration unit while either of the first and second remote refrigeration units is in a cooling cycle.

6. The method of claim 1 including the steps of:
   providing a control voltage from the electrical control of each refrigeration unit in a cooling cycle,
   applying each such control voltage to the electrical control of each of the other refrigeration units,
   and using said control voltage to modify the electrical control of a refrigeration unit in a heating cycle, to cause the evaporator of each refrigeration unit in a heating cycle to function as a condenser for each refrigeration unit in a cooling cycle.

7. The method of claim 6 wherein the step of using a control voltage being provided by a refrigeration unit in a cooling cycle to modify the control of each refrigeration unit in a heating cycle, includes the steps of:
   closing the suction line valve of each refrigeration unit in a heating cycle,
   and opening each closed suction line valve as soon as a refrigeration unit associated with a closed suction line valve terminates a heating cycle.

8. The method of claim 1 including the steps of:
   providing controllable valves in the hot gas, liquid and suction lines of each of the host and first and second remote refrigeration units,
   providing a unidirectional suction line to liquid line refrigerant flow path in each of the host and first and second remote refrigeration units,
   and providing a suction lien check valve in the suction line of each of the host and first and second remote refrigeration units,
   whereby each of the host and first and second remote refrigeration units may selectively condition a fresh load or a frozen load in the associated compartment.

* * * * *